United States Patent [19]
Boenigk et al.

[11] Patent Number: 5,483,126
[45] Date of Patent: Jan. 9, 1996

[54] METHOD OF CONTROLLING THE COLOR TEMPERATURE IN A SODIUM HIGH-PRESSURE DISCHARGE LAMP, AND APPARATUS TO CARRY OUT THE METHOD

[75] Inventors: Michael Boenigk; Klaus Guenther, both of Berlin; Hans-Georg Kloss, Hohen Neuendorf; Teja Tehmann, Berlin, all of Germany

[73] Assignee: Patent-Treuhand-Gesellschaft F. Elektrische Gluehlampen mbH, Munich, Germany

[21] Appl. No.: 182,597

[22] Filed: Jan. 18, 1994

[30] Foreign Application Priority Data

Jan. 19, 1993 [DE] Germany ............... 43 01 256.6

[51] Int. Cl.⁶ .................................................. H05B 41/36
[52] U.S. Cl. .................. 315/307; 315/224; 315/287; 315/209 R
[58] Field of Search ........................ 315/307, 224, 315/287, 209 R, DIG. 4, DIG. 7, 291, 225, 244, 208, 289, DIG. 2

[56] References Cited

U.S. PATENT DOCUMENTS 5,182,503  1/1993  Denneman et al. ............... 315/224

FOREIGN PATENT DOCUMENTS

0334356A1  9/1989  European Pat. Off. .
0439863A1  8/1991  European Pat. Off. .
0504967A1  9/1992  European Pat. Off. .
3636901A1  5/1988  Germany .

OTHER PUBLICATIONS

Journal Of The Illuminating Engineering Society, vol. 21, No. 1, Dec. 1992, New York, pp. 60–68, article by Rutan et al. "Practical Application of Pulsed High-Pressure Sodium Lamp Technology".

*Primary Examiner*—Ali Neyzari
*Attorney, Agent, or Firm*—Frishauf, Holtz, Goodman, Langer & Chick

[57] ABSTRACT

To control the color temperature of a sodium high-pressure discharge lamp, preferably having a sodium and xenon fill, which may also include mercury, without essentially affecting the color rendition index of the emitted light, or the light flux or intensity of light radiation emitted, the lamp is operated under pulsed conditions, in which the instantaneous pulse power of recurring power pulses, separated by a holding phase to prevent extinction of the lamp, is controlled. Preferably, the overall energy of any one of said power pulses and the intervening holding pulse is maintained essentially constant, for example by varying the frequency of sub-pulses or oscillations of which the sequential power pulses are constituted. A frequency and power controllable oscillator (1) is connected to the lamp (3) through a series LC network to effect such control, thereby permitting adjustment of color temperature and matching of the light output to selective color reflectivity of illuminated objects.

19 Claims, 3 Drawing Sheets

METHOD OF CONTROLLING THE COLOR TEMPERATURE IN A SODIUM HIGH-PRESSURE DISCHARGE LAMP, AND APPARATUS TO CARRY OUT THE METHOD

Reference to related application, assigned to the assignee of the present invention, the disclosure of which is hereby incorporated by reference:

U.S. Ser. No. 08/182,596, filed Jan. 11, 1994, BOENIGK et al.

Reference to related publication:

European Published Patent Application 0 504 967 A1, Derra et al (claiming priority Netherlands Appln. Serial 91 00458, filed Mar. 15, 1991).

FIELD OF THE INVENTION

The present invention relates to a method and an apparatus to control the color temperature in a sodium vapor high-pressure discharge lamp which is energized by pulse energy from a suitable pulse power supply, and more particularly to set the color temperature of the light output from the sodium high-pressure discharge lamp at selected predetermined levels.

BACKGROUND

Economical light sources with excellent color rendition are used to illuminate interior spaces, and particularly sales floors and sales rooms, as well as display windows, where the color of objects, as it appears to the human eye, is of substantial importance. Energy-efficient light sources having a color temperature in the region of about 3000K, and less, are preferred. The desired color temperature depends, among others, on the decor and utilization of the space which is to be illuminated and, also, on the type and nature of the articles which are being illuminated. It is often impossible to predict the effects of the spectral reemission characteristics of the illuminated objects. Frequently, the perceived color cannot be predicted because it is within the psychological-physiological perception of the observer. Thus, suitability of any particular light source for any special application cannot be reliably predicted and frequently must be determined experimentally. Additionally, if the nature of the illuminated objects changes, which frequently occurs in display windows, the color temperature of the light illuminating the respective objects may have to be readjusted.

The prior art provided only one single light source in which the color temperature of the light output can be changed within certain limits, namely the incandescent lamp. Upon operation of a given incandescent lamp at different power levels, the color temperature changes; unfortunately, the light flux or light output changes much more with change in power level, and hence color temperature. An objective comparison of the effect of the changed color temperature of the light in the illuminated surroundings is very difficult because of the change in power level, entirely apart from the fact that operation of incandescent lamps with low color temperatures is highly inefficient and cannot be tolerated for economical reasons. Use of different types of light sources having different color temperatures is difficult, since the respective light sources frequently can be used only with light fixtures of different radiation characteristics. Additionally, purchasing, storing and stocking light sources having different color characteristics for use only under specific circumstances is economically unacceptable. The radiation characteristics of such different light sources, likewise, can influence the subjective impression of the perceived color reemitted or reflected from illuminated objects.

Published European Patent Application 0 504 967 A1, Derra et al, describes a circuit arrangement for pulsed operation of a sodium high-pressure lamp which can be dimmed, so that the luminous flux emitted from the lamp can be controlled. The specification notes that changing the supplied energy, and hence the light output from the lamp, also changes the color temperature, and it is stated that the inventors were surprised to find that a greater luminous flux is accompanied by a higher color temperature. The behavior of a lamp in the circuit disclosed, thus, is similar to that of an incandescent lamp under dimmer control.

THE INVENTION

It is an object to provide a method to control different color temperatures in a sodium high-pressure discharge lamp without, essentially, affecting the emitted light flux or light intensity of the lamp, and not essentially changing the color rendition index of the emitted light, and to an apparatus for so controlling a sodium high-pressure discharge lamp.

Briefly, the instantaneous pulse energy supplied to the lamp is so controlled that the color temperature of the emitted radiation is changed, as desired, while the color rendition index and the emitted light flux are maintained at a stable predetermined level. The pulse energy itself is formed as a high-energy pulse or burst of a closely following sequence of short sub-pulses of individually high energy, with a holding pulse of low energy between the high energy pulse. The subpulses, preferably, are provided in the form of a high-frequency oscillation having a predetermined base frequency; the instantaneous pulse energy can be changed by changing this base frequency.

The apparatus utilizes a frequency and therefore power controllable oscillator and a passive LC network; the oscillator is controlled with respect to its frequency and energy output in accordance with the desired color temperature of the light to be emitted by the sodium high-pressure discharge lamp.

It has been found that the sodium high-pressure discharge lamp, energized with a pulsed energy supply, is thus suitable to provide light in which the color temperature can be controlled, thereby providing an energy-efficient alternative to an incandescent lamp for uses where different color temperatures are needed.

When providing pulsed energy supply, the lamp will be operated at an average energy due to the sequence or bursts of high-energy short sub-pulses, separated by a usually much longer holding pulse of low power. This holding pulse, occurring in the pauses between the high-energy pulse which, in turn, is formed by the sub-pulses, prevents extinction of the discharge lamp. Thus, the overall, average power is a composite of the sequence of high-power pulses and the low energy holding pulse. It has been found, surprisingly, that supplying a sodium high-pressure discharge lamp with an energy profile of this type permits independent control of color temperature and color rendition index. Investigations have shown that the color temperature is determined by the instananeous energy supplied to the sodium high-pressure discharge lamp during the pulse phase. The color rendition index, however, is determined primarily by the vapor pressure within the lamp which, in turn, is dependent on the dead space temperature behind the electrodes, and hence of the average overall energy supplied to the lamp. The color temperature of the radiation emitted from the lamp thus can be controlled practically independently of the other characteristics of the lamp by suitable control of the instantaneous energy of the instantaneous pulses, whereas the overall light flux, that is, the overall energy supplied to the lamp, can be controlled by suitable adjustment of the frequency of the sub-pulses following each other, and the pulse width of the resulting high energy supply pulse. Thus, it is possible to operate a sodium high-pressure discharge lamp at a rated light output and at a given color rendition index, while shifting the color temperature of the emitted light between about 2500K and more than 3000K.

Preferably, the instantaneous pulse energy is provided as a high-frequency base oscillation of a predetermined frequency and number of oscillations, so that the instantaneous pulse energy can be easily controlled by changing the base frequency.

The apparatus to control the color temperature of a high-pressure sodium discharge lamp can be easily constructed by use of an oscillator and a passive LC network connected between the oscillator and the lamp. The oscillator should be frequency and power controllable. By shifting the base frequency, the pulse energy supplied to the lamp is changed since the impedance of the LC network between the oscillator and the lamp is dependent on the base frequency, and hence will change. A control of this type, that is, of the instantaneous pulse power, has low losses and invasion of the energy supply circuit is avoided.

DRAWINGS

FIG. 1 is a highly schematic diagram of the circuit principle of a supply apparatus for the pulsed power operation of a sodium high-pressure discharge lamp;

FIG. 2 shows, in two associated graphs a and b, the pulse power P/applied to a sodium high-pressure discharge lamp from a supply apparatus as shown in FIG. 1, in dependence on time t, shown on the abscissa, to obtain radiation of a predetermined color temperature; and FIG. 3 collectively illustrates in FIGS. 3a and 3b, in time-expanded form, pulse power levels P (ordinate), in dependence on time t (abscissa) to obtain, respectively, radiation of a color temperature of 3000K FIG. 3a and 2600K FIG. 3b.

DETAILED DESCRIPTION

Figure 1:
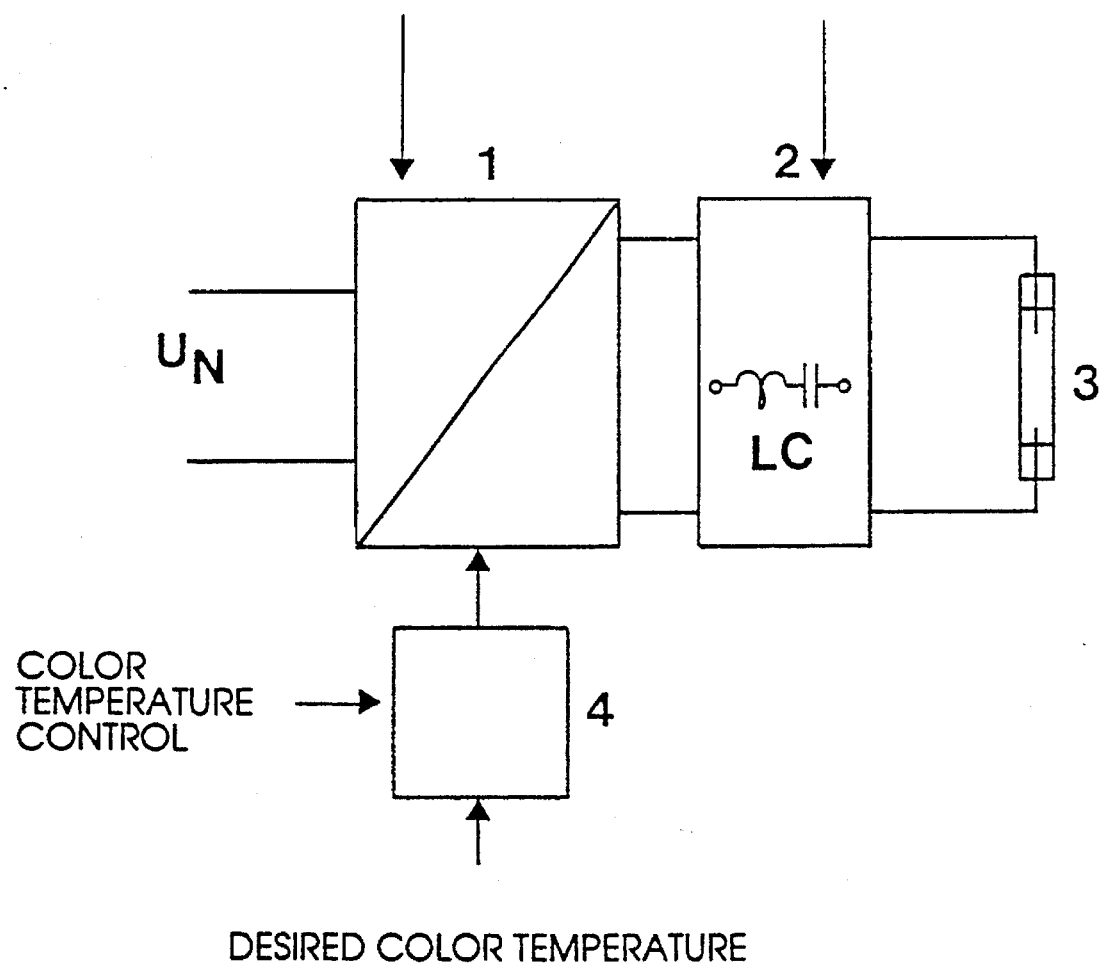

Referring first to FIG. 1 which shows, in highly schematic form, a circuit arrangement to obtain controllably different color temperatures from a sodium high-pressure discharge lamp 3, shown only schematically, and being of any customary construction.

The circuit has an energy supply oscillator 1, controlled by a color temperature control unit 4, and a passive LC network 2. The desired color temperature is controlled by suitably controlling the oscillator 1 from the control unit 4. In one example, a sodium high-pressure discharge lamp of 70 W rating used a passive LC network 2 comprising a series circuit of an inductance L of 115 µH, and a capacitor C of 470 nF. The oscillator 1 is supplied by electrical energy from a source $U_N$.

Figure 2:
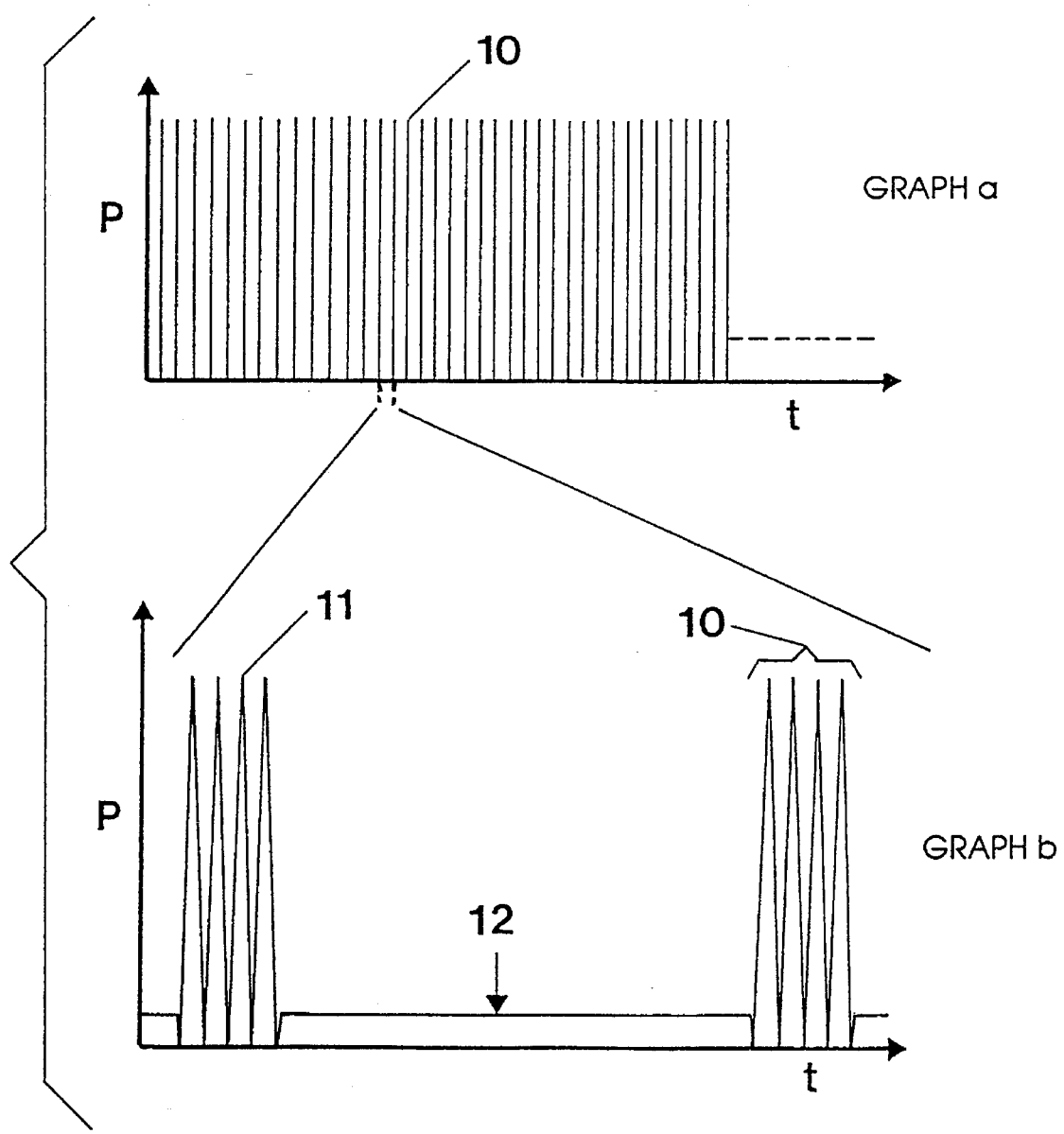

The power pulses 10 which, over time, provide pulse energy, are shown by the ordinate P in FIG. 2, graph a. Each power pulse is a burst or a rapidly following sequence of sub-pulses 11; the bursts or power pulses 10 have a repetition frequency of between 100 and 600 Hz, with a pulse width of between 100 and 500 µs. The power pulses 10, themselves, are formed by the sub-pulses 11 which have a base frequency in the kilohertz region, and are separated by holding pulses 12, see graph b, which illustrates the sequence of two pulses 10 in time-expanded form. The holding pulses 12 prevent extinction of the lamp between the power pulses 10, formed of the sub-pulses or oscillations 11.

Figure 3A:
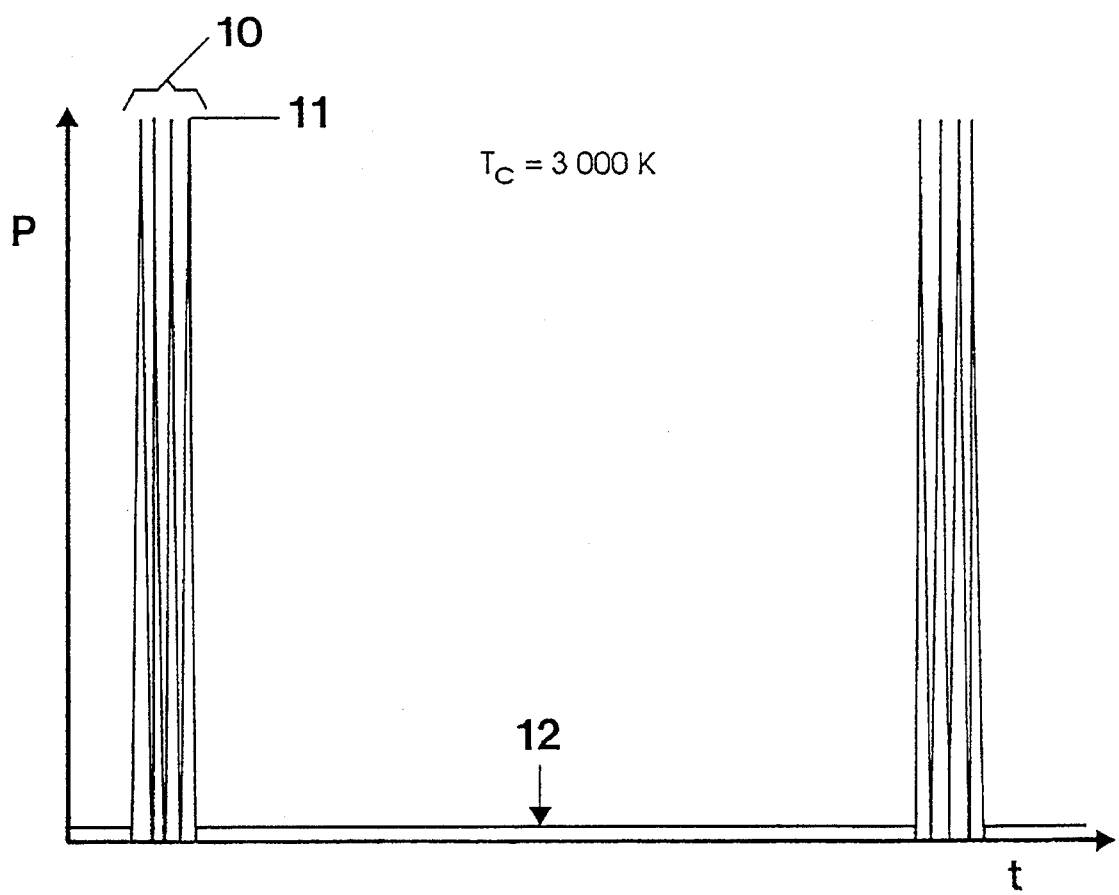
Figure 3B:
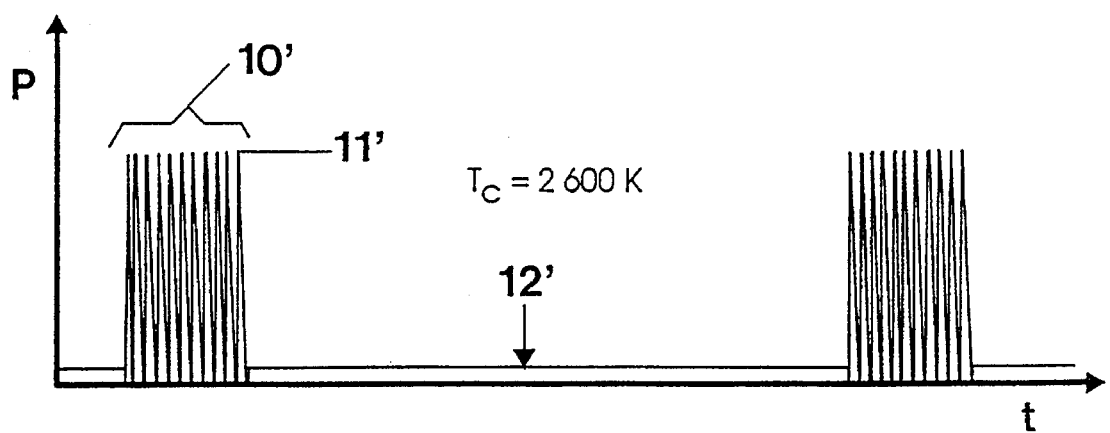

Control of the color temperature is best seen by reference to FIG. 3, collectively which shows, in FIGS. 3a and 3b, the energy supply for a sodium high-pressure discharge lamp for different color temperatures. The sodium high-pressure discharge lamp, again, was a 70 W lamp, and the color temperatures Tc were, in FIG. 3a, 3000 K, and for FIG. 3b 2600K.

As can be seen from FIG. 3, a, the instantaneous pulse power is 1.35 kW, and the holding power 22 W. The power pulses 10 have a repetition frequency of 160 Hz, and a pulse width of 250 µs. The base frequency of the sub-pulses 11 was 24 kHz. Under these operating conditions, the lamp operates at an average power of 76 W. The lamp had a pure sodium and xenon fill at a pressure of 150 mbar. The radiation emitted from the lamp has a color rendition index Ra of 80, and a light flux of 4200 lm.

Operation of the aforementioned lamp to emit light at a lower color temperature of 2600 K is schematically shown in FIG. 3b. The base frequency of the sub-pulses 11' is shifted to 47 kHz. The power of the power pulse 10' is dropped to 0.36 kW. The repetition frequency of pulses 10' is changed to 210 Hz with a pulse width of 340 µs. Holding pulse 12' is shorter than pulse 12 (FIG. 3a).

The lamp will operate at an average at 79 W, the light flux rises slightly to 4500 lm; the color rendition index Ra=80 remains unchanged.

Since the supplied energy depends on power and time, it can be seen that the overall energy supplied to the lamp under the conditions of FIGS. 3a and 3b, as supplied to the lamp, has not changed materially.

By pulse operation of a sodium high-pressure discharge lamp, it became possible to utilize lamps without mercury additives, as in the lamp of the present example. The method, however, is equally applicable to sodium high-pressure discharge lamps which do contain mercury. The light data, however, will change somewhat under those conditions.

We claim:

1. In the combination of a sodium high-pressure discharge lamp with a controllable electrical energy supply apparatus coupled to and energizing said lamp, a method to control the color temperature of light emitted from the lamp without essentially affecting the color rendition index and the omitted light output of the lamp, comprising the steps of
   controlling the controllable electrical energy supply apparatus (1) to supply lamp operating energy to the lamp in pulse form; and selectively controlling the instantaneous pulse power supplied to the lamp by said electrical energy supply apparatus (1) to vary the color temperature of the emitted radiation, selectively, based on said selective control.

2. The method of claim 1, wherein the instantaneous pulse power supplied comprises a rapidly following sequence of short power pulses (10, 10') of high power and a low-power holding pulse (12, 12') between the sequence of high-power pulses.

3. The method of claim 2, wherein said short power pulses (10, 10') comprise bursts of a plurality of high-frequency sub-pulses or oscillations (11, 11') having a selected base frequency; and wherein the control of the instantaneous power of the power pulses (10, 10') comprises changing the base frequency of the sub-pulses or oscillations.

4. The method of claim 3, including the step of changing the instantaneous power level of the sub-pulses or oscillations.

5. The method of claim 4, wherein the pulse energy of said power pulses (10, 10') supplied to the lamp is maintained at an essentially constant level.

6. In the combination of a sodium high-pressure discharge lamp with a controllable electrical energy supply apparatus coupled to and energizing said lamp, a method to control the color temperature of light emitted from the lamp without essentially affecting the color rendition index and the omitted light output of the lamp, comprising the steps of controlling the controllable electrical energy supply apparatus (1) to supply lamp operating energy to the lamp in pulse form; and selectively controlling the instantaneous pulse power of pulses supplied to the lamp, by supplying said pulses in form of a sequence of bursts or a group (10) of rapidly recurring sub-pulses (11, 11'), said pulses having high frequency, said groups or bursts being separated by periods or phases of low power pulses forming holding pulses (12) until occurrence of a subsequent high-power pulse or burst constituted by said group of short sub-pulses.

7. The method of claim 6, including the step of varying the frequency of said sub-pulses (11, 11').

8. The method of claim 6, including the step of varying the instantaneous power level of said sub-pulses (11).

9. The method of claim 7, including the step of varying the instantaneous power level of said sub-pulses (11, 11'), while maintaining the overall energy level of said group of sub-pulses (11, 11') and said holding pulse (12) essentially constant.

10. The combination of a sodium high-pressure discharge lamp (3) with a controllable electrical energy supply apparatus (1, 2, 4) for supplying electrical energy to the lamp, in pulsed form, while permitting control of the color temperature of light emitted from the high-pressure sodium discharge lamp, carrying out the method of claim 1, said apparatus comprising, in a frequency and power controllable oscillator (1);

an LC network (2) connected between said oscillator (1) and the lamp (3); and a control unit (4) connected to said oscillator controlling the frequency and instantaneous pulse power of pulses supplied by the oscillator (1).

11. The combination of claim 10, wherein said sodium high-pressure discharge lamp (3) has a fill of sodium and xenon.

12. The combination of claim 10, wherein said LC network is tuned at least approximately to a base frequency of said power pulses (10, 10').

13. The combination of claim 10, wherein said sodium high-pressure discharge lamp (3) has a fill of sodium, xenon and mercury.

14. The combination of claim 11, wherein said LC network is tuned at least approximately to a base frequency of said power pulses (10, 10').

15. The combination of claim 13, wherein said LC network is tuned at least approximately to a base frequency of said power pulses (10, 10').

16. The method of claim 1, wherein said high-pressure sodium discharge lamp has a fill of sodium and xenon.

17. The method of claim 1, wherein said sodium high-pressure discharge lamp (3) has a fill of sodium, xenon and mercury.

18. The method of claim 6, wherein said sodium high-pressure discharge lamp (3) has a fill of sodium and xenon.

19. The method of claim 6, wherein said sodium high-pressure discharge lamp (3) has a fill of sodium, xenon and mercury.

* * * * *